Patented Feb. 12, 1952

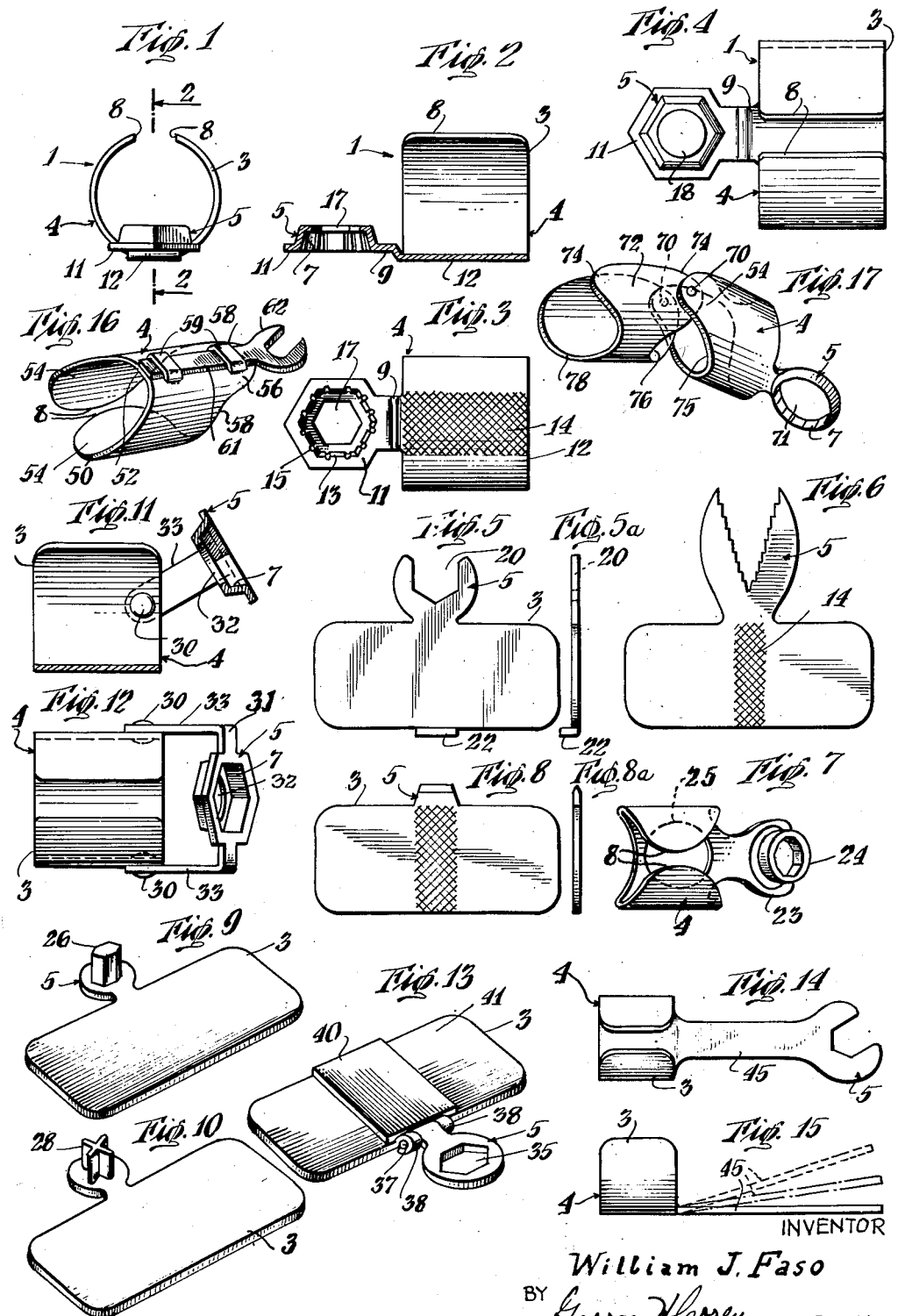

2,585,641

UNITED STATES PATENT OFFICE 2,585,641

FINGER-SUPPORTED TOOL FOR LOCATING AND TURNING SMALL NUTS, BOLTHEADS, ETC.

William J. Faso, Bayside, N. Y., assignor of one-half to Samuel J. Goldstein, Beaver Falls, Pa.

Application July 21, 1945, Serial No. 606,355

11 Claims. (Cl. 81—177)

1

This invention relates to wrenches, screw drivers and similar tools for holding and turning threaded fasteners, such as bolts and screws. The invention more specifically relates to tools for holding and turning such bolts or screws in constricted places where it is difficult or impossible to have access to the head of the bolt or screw or to the nut with conventional tools or where it is impossible to manipulate such tools by the hand. The device of the invention is particularly adapted for use with fasteners of relatively small size.

While hand tools heretofore have been made in small sizes for use with small screws, bolts and nuts, they have been designed for the most part in conventional form, requiring deftness on the part of the operator to manipulate them, since in constricted places only two or three fingers of one hand could be used both to hold the tool and to move it so as to carry out the operations of inserting, tightening and loosening and removal of such fasteners. For the most part these conventional tools have been designed for manipulation with free use of the hand in situations where direct access to the fastener is possible, even though located in a pocket or in a narrow passage leading from the outside of the structure in which the fastener is used.

While special tools may be designed for some conditions and locations of the fastener, where the screw or other fastener is inaccessible to conventional tools in many cases it is impossible with the tools heretofore available to remove or insert the fastener without disassembling the structure to provide ready access to the location of the fastener which it is necessary to reach. For example, in the construction of apparatus and equipment, such as radio cabinets and chassis, automobile dashboards, electrical equipment, sheet metal lockers and cabinets and many other devices and appliances, fasteners of relatively small size are used. These fasteners in many cases of necessity are located in recesses or pockets in the parts or in the structure behind supports or in places in which other parts partially or wholly cover the fastener. They are, therefore, difficult or impossible to reach with the tools of conventional or special design after the structure is assembled. Adjustment or removal of parts and tightening of fasteners may not be accomplished without disassembling the structure. In many instances such special tools, as heretofore designed, are themselves inconvenient because of their size and because they are designed for manipulation by the hand or by the use of several fingers to insure a firm grasp.

2

It also frequently happens in attempting to remove a fastener without removal of parts which would provide free access of the tool, that the fastener may be loosened from the outside but with the risk that it may drop within the appliance or structure where it cannot be reached. In other cases the fastener may be loosened, for example for adjustment, by unscrewing it in its nut from the outside of the appliance or structure but the nut at the inside may be lost because it is not possible to reach it with a conventional tool at the inside of the appliance or structure. The situation also arises where, upon loosening the fastener from the outside, the nut or the head of the screw or bolt is loosened from its friction or other holding engagement at the inside of the appliance and, thereafter, turns when the attempt is made again to tighten the fastener from the outside because sufficient frictional contact may not be secured for the nut or head of the bolt or screw which is inaccessible to ordinary tools. In many such situations, although the head of the fastener or the nut may not be reached with a conventional or a special tool it may be reached by the finger of the hand. The pressure or force which the finger unaided may place upon the fastener to hold or to turn it, however, although occasionally effective, for the most part is insufficient to hold the fastener or the nut or to turn them for loosening or tightening.

It is an object of the invention to provide a simple tool operable by a finger of the hand which will serve to engage the head of a screw or bolt or the nut cooperating therewith to hold such a fastener or its nut against turning when located in a constricted space and to turn the fastener or the nut in such space.

A more specific object of the invention is to provide a tool which may be slipped over the end of a finger and may be retained thereon and which is provided with means for engaging a fastener for holding or turning thereof and with means for aiding the finger to resist movement of the finger and the tool.

A further object is to provide such a tool to be carried by and manipulated by a finger of the hand, and particularly by the end portion of the finger, which is constructed also so that the finger may feel the fastener which it is desired to engage without the necessity of seeing the position or the relation of the fastener to the appliance or structure in which it is located.

It is a still further object of the invention to provide tools capable of performing the functions of screw drivers and wrenches and similar tools which are manipulatable by a finger and which do not require substantially more space to reach the fastener than is required by the finger itself so that, if the fastener may be felt by the finger, the tool may be brought into engagement therewith and may be manipulated to hold or to turn the fastener or the nut cooperating therewith, the tool being formed so that it may be brought into bearing contact with an adjacent surface to aid the finger in resisting movement.

For the purpose of attaining the above stated objects, the tool of the invention is formed to embrace the finger and to fit thereto so as to be retained on the finger and particularly on the end portion thereof beyond the first joint. This finger embracing portion of the tool may be made so as to be adjustable to fingers of different size or the tool may be made in different sizes for this purpose. Preferably this portion of the tool is in the form of a ferrule, generally cylindrical and of relatively thin wall thickness although sufficient to provide the requisite rigidity. This ferrule when made of metal or similar bendable material may be provided with a slot lengthwise thereof to provide for bending the wall material to adjust the size so as to fit the finger.

Extending from the wall of the ferrule, preferably at the side thereof opposite to the slot, if such slot is provided for size adjustment, is the fastener engaging portion of the tool. This portion is held in rigid relation to the ferrule so that, upon manipulation by the finger and particularly the end portion thereof, force may be brought upon the fastener to effect turning or holding action. This fastener engaging portion may take different forms, as will be described hereinafter, and may be arranged in different angular relations to the ferrule to accommodate the tool to the locations of fasteners in pockets or behind obstructions. In a modified embodiment of the invention, however, the fastener engaging portion of the tool may be supported in hinged or pivotal relation to the ferrule so that this portion may be adjusted by the fingertip to the most convenient angle for engagement with the fastener under the particular conditions of its location and accessibility.

A particular feature of the invention is that the part which engages the nut or bolt head is in offset relation to the exterior surface of the ferrule inwardly toward the finger so that, without interference of the part, this exterior surface may be brought into bearing contact with an adjacent surface of the structure to aid the finger in holding the tool against movement.

A further feature of the invention is the provision on the exterior surface of the ferrule of a frictional surface which may be secured by knurling of this surface or by a friction coating thereon. This friction surface is so positioned on the ferrule that it may be brought into engagement with the wall in which the fastener is placed or with some part adjacent to the fastened to secure resistance to turning of the fastener when the finger presses the ferrule against such wall or part. It is common experience in the use of tools for holding and turning fastening devices that a little extra pressure brought upon the screw or the bolt head or upon the nut sometimes makes it possible to hold the fastener sufficiently to complete the loosening or tightening thereof. It is also common experience that in a constricted space where tools of conventional type may only be manipulated by two or three fingers of one hand, sufficient grip may not be brought upon such a tool engaging a stubborn fastener, for example one with a rusted or a tight nut, to prevent its turning in the hole. The provision of the friction surface at the exterior of the ferrule of the tool of the invention makes it possible for the finger better to resist the turning movement and to do so with a lever advantage in many cases as will hereafter appear.

Other objects and features of the invention will be understood from the description to follow of the drawings in which:

Fig. 1 is an end view of the tool of the invention in one embodiment thereof;

Fig. 2 is a section on line 2—2 of Fig. 1;

Fig. 3 is a view looking upward in Fig. 2;

Fig. 4 shows a tool otherwise similar to the tool of Figs. 1, 2 and 3 but provided with a finger holder designed to receive more than one finger;

Figs. 5, 6, and 8 are face views of partially formed blanks showing fastener engaging projections of different types;

Fig. 5a and Fig. 8a are respectively edge views of the blanks of Figs. 5 and 8.

Fig. 7 is a perspective view of the tool of the invention having a modified ferrule and a pivoted fastener engaging member.

Figs. 9 and 10 are perspective views of blanks for formation of the ferrules of the tool of the invention which are provided respectively with projecting parts for engaging two different types of recess as in recessed head screws;

Fig. 11 is a sectional view of another modification of the tool of the invention utilizing a pivoted fastener engaging member;

Fig. 12 is a view looking down on the finger holder of Fig. 11;

Fig. 13 is another modification using a hinged fastener engaging member;

Fig. 14 is a top view; and

Fig. 15 is an elevation of a further modification of the invention.

Fig. 16 shows a perspective view of a modification of the invention adapted for detachably holding a fastener engaging member.

Fig. 17 is another modification in perspective view adaptable for use with the finger of the hand in bent position.

In Figs. 1–3 inclusive is shown an embodiment of the invention in a tool suitable for use as a wrench for engaging hexagon nuts and boltheads. The tool 1 may be made from a flat blank of sheet metal. The portion 3 may be flat as it is cut from the sheet. The recess 7 of hexagon shape may be formed in the part 5 by a suitable die stamping operation. The flat portion 3, by the use of a suitable die or forming device, may be shaped as the ferrule 4, as shown in Figs. 1, 2 and 3. This ferrule in these figures is substantially of cylindrical shape and the blank from which it is made is of such length between ends 8 thereof that a space is left between these ends when the ferrule is completed, as shown in Fig. 1.

The part 5 formed as an extension of the ferrule 4 is connected by the connecting portion or neck 9 so as to position the part 5 in relation to the ferrule 4 so that this part 5 may be brought into engagement with the nut or with the head of the bolt received into the recess 7. As shown in Figs. 1, 2 and 3, the neck 9 provides an offset which positions the face 11 of the fastener engaging part 5 in inwardly offset relation to the circumferential surface 12 of the ferrule 4 at the side thereof where the neck is attached to the ferrule. This offset may be different in different modfications of the tool of the invention to suit different conditions in which the tool may be used. For most purposes the amount of offset need merely be sufficient to avoid contact of the face 11 with the surface of the structure or appliance against which the head of the bolt or screw or the nut bears. The neck 9 may be so formed, moreover, in relation to the ferrule 4 and the part 5 that the part 5 is held in any suitable angular relation to the ferrule to provide convenient engagement with the fastener.

Another purpose of the offset provided by the neck 9 is to make it possible to insure that the surface 12 may be pressed against the surface upon which the head of the bolt or the nut bears, or other adjacent surface, without being prevented by contact of the face 11 of part 5 with such surface, in order to utilize the friction which may be developed between the circumferential surface of the ferrule and said surface on which the nut or bolt bears. This frictional contact serves to help the finger inserted in the ferrule to resist turning movement of the nut or bolthead when turning movement of the related threaded part of the fastener is effected by means of a screw driver or wrench or other means. To this end, as shown in Fig. 3, the portion 14 of the circumferential surface 12 of the ferrule may be knurled to provide a rough surface affording a good frictional contact.

In the extension part 5 the recess 7 is formed for receiving the nut or the bolthead. As shown in Fig. 2, this recess 7 is tapered toward the inner end of the recess so that the nut or bolthead may readily enter therein and for the further purpose that variations in the size of the nut or of the bolthead may be accommodated, such nut or head of the bolt entering to a greater or less depth in the recess to come into engagement with the walls 13 thereof so as to hold the nut or the bolthead from turning in the part 5 of the tool. In this embodiment the recess 7 is of hexagon shape for engaging hexagon nuts or boltheads. In order further to accommodate variations in the sizes of such nut and boltheads, in the walls 13 of the recess 7 small notches 15 are formed by the die stamping operation or otherwise which serve to engage the corners of odd sized nuts or boltheads which do not fit closely to the shape of the recess at some depth therein. Especially with small fasteners for which the tool of the invention is particularly suited, these variations of size occur and are accommodated by the tapered form of the recess 7 and by the notches 15.

The ferrule 4 is formed to embrace the finger so as to fit thereto sufficiently closely to retain the tool on the finger without the aid of other fingers of the hand. The ferrule is open at both ends and thus provides for the end of the finger passing through the ferrule to reach the fastener engaging part 5. It is possible for the workman, therefore, to use the end of his finger to feel the fastener when located in a pocket or behind an obstruction where it is not possible to see the fastener but which the finger can reach. By thus locating the fastener by feeling with the end of the finger, the workman then readily may bring the fastener receiving recess of the part 5 into engagement with the nut or the head of the bolt. If in feeling for the fastener, the workman finds that the tool is not properly positioned on his finger to effect such an engagement, he may move the finger within the ferrule or may move the ferrule on the finger either lengthwise of the finger or rotatably thereon. These movements may be accomplished in many cases without withdrawing the finger from the pocket within which the fastener is positioned, by using the thumb or an adjacent finger of the hand or by engaging the tool with some part of the structure or appliance upon which the work is being done. This possibility of movement of the finger within the ferrule while providing also a sufficiently close embrace to enable the finger to hold the tool engaging the fastener and to operate it against the turning movement thereof, or to operate the tool to produce such turning movement of the fastener, affords a ready adaptibility of the tool to varying conditions and varying positions of the fastener relative to the pocket or passage through which the finger and the tool must be inserted to reach the fastener.

In order further to assist in locating the fastener and to determine whether or not it is rotating in the hole in which it is placed, the part 5 of the tool is provided with an opening 17 which, in the tool shown in Figs. 1–3, is in the bottom of the recess 7. The cushion end of the finger may be placed upon the back surface of the part 5 at this opening 17 and may feel the head of the bolt or the nut therethrough. Under conditions where the fastener my not be seen, this makes it possible for the workman to determine whether the loosening or tightening operation is proceeding properly, for example, whether or not the nut or the head of the bolt is turning within the recess 7, making necessary the use of a tool having a recess of different size to hold the nut or bolthead. The workman also can determine by feeling through the opening 17 whether a bolt or screw being driven in a nut held in the recess 7 of the tool is turning properly in the nut to loosen or tighten as desired. It will be apparent, therefore, that the tool of the invention is so constructed that it may be sensitively used by the workman in blind work under conditions where the finger and the sense of feel may be used to determine the proper actuation of the tool and, as well, to apply the force requisite to such loosening and tightening operation of the fastener.

The opening 17 may be of any suitable shape. In the embodiment of Figs. 1 to 3 it is of hexagon shape and of a size for engaging a smaller nut or bolthead than may be operatively engaged by the recess 7 and its notches 15.

In Fig. 4 is shown a view, taken as if looking down in Fig. 2, of a tool 1 of similar form to that of Figs. 1 to 3, but with the ferrule 4 shaped to embrace two adjacent fingers of the hand. The part 5 in this embodiment is shown as of the same size as that of Figs. 1 to 3 and formed to receive a hexagon nut or bolthead. The opening 18 in this embodiment is circular which serves to provide for feeling the fastener as above described and may be used where it is not necessary to provide in the same tool an additional nut or bolthead engaging opening. Variations in the size and shape of the recess 7 and of the openings 17 or 18 to suit different fasteners and situations thereof may be made within the scope of the invention. The provision of a ferrule for embracing a plurality of fingers or a portion of the hand with the fingers extending through the ferrule for the purposes which have been described makes it possible to apply more force to the tool where the fastener is difficult to turn or to hold than is possible with the ferrule embracing a single finger.

In Figs. 5 and 6 are shown blanks for tools embodying the features of the invention but with the part 5 made in forms corresponding to tools of conventional type. In Fig. 5 the part 5 is in the form of a straight open-end wrench which may be used for engagement of a hexagon or a square head bolt or nut, the width and depth of the opening 20 being the same as that of the conventional tool for the size of fastener to be engaged.

At the opposite side of the ferrule-forming blank 3 in Fig. 5 the tool is provided with a screw driver end 22 which by a suitable bending operation may be turned at right angles to the plane of the blank 3, as shown in the edge view in Fig. 5a. This tool may be used for reaching slotted screwheads where the screw is in a wall of a passage or pocket which is in a parallel relation to the direction in which the finger must be inserted to reach the fastener. It will be apparent that when the part 3 of the blank of Fig. 5 is formed into a ferrule to embrace the finger, as shown in Fig. 1, the part 5 may be used as a wrench in a similar manner as that described in connection with Figs. 1–4, inclusive, when the finger is inserted in the ferrule in one direction. The tool of Fig. 5 may be used as a screw driver in the manner above mentioned by inserting the finger through the ferrule in the opposite direction. In this embodiment of the invention the knurling above referred to in connection with Fig. 3 is omitted but a friction surface may be provided, if desired, by other means, such as a thin coating of rubber adhering to the outer surface of the ferrule adjacent the part 5 so as not to interfere with the engagement of the screw driver end 22 with the slot in the screw when the tool is used as a screw driver.

Fig. 6 shows an embodiment of the invention in which the fastener engaging part 5 is in the form of the conventional alligator wrench. Knurling as indicated at 14 is provided in this embodiment of the invention at the surface which In Fig. 7 is shown another modification of the tool of the invention embodying the above described features and certain other features hereafter described which are provided by the shape of the ferrule. In Fig. 7, the forked part 23 extends from the ferrule 4 and the ends of the fork are turned inwardly to support the ring 24 for pivotal movement thereof. The ring 24 thus may be moved into various positions angularly related to the ferrule so as to engage fasteners in different positions. This movement of the ring may be effected by the end of the finger embraced by the ferrule, which also may feel the fastener as above described, or it may be moved by an adjacent finger of the same hand. This adjustment of the position of the ring 24 may be accomplished by feel of the fingers in many cases without withdrawing the finger from adjacent the fastener location. The ring 24 in this embodiment is provided with an opening having an outline to accommodate nuts or bolts which may be in any one of a plurality of positions angularly displaced about the axis of the fastener. This form of opening in the ring 24 makes it possible to engage the nut or the bolthead in a restricted space where only limited turning movement may be had, one or the other of the sets of recesses provided by the outline of the opening being engageable by the nut or bolthead.

As shown in Fig. 7 the ferrule 4 may have an aperture 25 formed in the wall thereof at the portion opposite the space or slot between the edges 8 thereof. Where it is desired to press the ferrule against an adjacent surface or part to aid the finger in holding the tool against turning as above described, the aperture 25 serves to enable the finger to feel such surface or part to determine, for example, whether the tool is slipping relative to such surface or part. Knurling may be provided, if desired, as above set forth, at the outside surface of the ferrule 4 adjacent the aperture 25 to secure greater frictional contact.

In Fig. 8 is shown a blank for a tool embodying the invention in which the part 5 projecting from the ferrule-forming portion 3 is shaped as a screw driver end. As shown in the edge view in Fig. 8a, this screw driver end projects in the plane which is tangent to the ferrule and not at right angles thereto as in Figs. 5, 5a. This form of the tool is suitable for reaching slotted screwheads in walls where the end of the finger may be directed toward the wall. As the ferrule embraces the end portion of the finger or may be moved on the finger to leave the knuckle at the first joint free for bending of the finger, the tool of Figs. 8, 8a may be directed to fasteners in other relations to the direction in which the finger is inserted in a passage or pocket of the structure being assembled or disassembled. It will be apparent that the manipulation of the tools of Figs. 5–8 inclusive may be accomplished utilizing the sense of feel, where this is necessary, in the same manner as described above in connection with the tool shown in Figs. 1–4.

In Figs. 9 and 10 are shown blanks for tools having the features respectively of the so-called Allen and Phillips types of wrenches. In Fig. 9 the part 5 extending from the blank 3 has fastened thereto, for example, by welding if the blank is made of sheet steel, a stub 26 of hexagon cross-section of the same size as is used in the corresponding Allen wrench. This stub may be made of tool steel and may be of slightly greater length than the depth of the hexagon recess in a recessed head screw of the type with which the Allen wrenches are intended to be used. For particular conditions the length of the stub 26 may be increased, but for the most part for the purpose of the invention a short stub which will not interfere with inserting the tool carried by the finger in a restricted space is preferable in order that the finger may readily reach the screw and may be able to feel its location and the position of the hexagon recess therein so as to move the tool and the finger into the most convenient position for engagement of the stub 26 in the recess of the screw.

In Fig. 10 is shown a similar tool embodying the invention but with the stub 28 in the form utilized in the so-called Phillips wrench which is adapted to engage the recessed crossed slots in the head of a screw of this type. It will be apparent that the function and method of manipulation of the tool of Fig. 10 is substantially the same as that of Fig. 9.

In Fig. 11 is shown another modification of the tool of the invention in which to the ferrule 4 is pivotally attached, by suitable rivets or other fasteners 30, a yoke 31 which carries the part 5 in which is formed a recess 7 of hexagon shape adapted to function as does the recess 7 of Fig. 2. At the bottom of the recess 7 a circular opening 32 also is provided in this embodiment for the purpose of feeling the fastener as described in connection with the device shown in Figs. 1–4. In the tool of Figs. 11 and 12 the rivets or other fasteners may be set up so that the yoke 31 is movable on the ferrule 4 in pivotal movement while providing sufficient friction between the legs 33 of the yoke and the wall of the ferrule to hold the yoke in any position to which it is moved by the finger. It will be apparent that when the finger is inserted from the left in Figs. 11 and 12, it may reach the yoke 31 and the part 5 carried thereby as well as the opening 32 in the bottom of the recessed part 5. It is thus possible for the finger to move the pivoted yoke 31 into different positions as well as to turn the ferrule on the finger in the manner above described, thus to bring the recessed part 5 into proper engagement with fasteners in many different positions and conditions of accessibility. The length of the legs 33 of the yoke 31 is such that the yoke may be pivoted into a large number of positions at angles to the axis of the ferrule at either side of the ferrule. This makes it possible to reach the fasteners at different sides of a pocket or passage in the appliance or structure into a pocket in which the finger is inserted for the purpose of reaching the fastener. It will be apparent, in consideration of the various positions into which the ferrule may be moved on the finger and particularly in view of the many positions which the part 5 may assume relative to the finger, and having regard also to the fact that the tool may be manipulated substantially by the movement alone of the first joint of the finger, that there is provided a great adaptability in the tool shown in Figs. 11 and 12 to many different positions of the fasteners in otherwise inaccessible places to effect the holding or tightening or loosening functions of such a tool.

In Fig. 13 is shown another modification of the invention in which the part 5 having a hexagon opening 35 for receiving a hexagon nut or head of a bolt is formed to be supported in hinged relation to the ferrule-forming blank 3 upon the hinge pin 37 and between the supporting projecting hubs 38 of the blank 3. It will be apparent that the part 5 thus may be swung into different positions about the pin 37 in order to bring the opening 35 into different relations to the finger and, therefore, to make it possible to engage fastener nuts or heads in different locations which are accessible to the end of the finger.

In Fig. 13 is shown a layer or coating 40 which may be of sufficient thickness to approximate the height of the hubs 38 above the face 41 of the blank 3, the exposed surface of coating 40 becoming the outside surface of the ferrule when it is formed to the shape the same as or similar to that of Fig. 1. This coating 40 may, for example, be of rubber of such character as to adhere to the blank 3 and may be applied thereto after the blank 3 has been formed into the shape of the ferrule. With a suitable die or other forming device, however, the coating may be applied to the blank before the ferrule is formed and, for example, may be of limited width, as shown in Fig. 13, so that the uncoated portions of the blank 3 may be engaged by the die in the ferrule forming operation. Other types of friction coating may be used and other methods of its application may be adopted in order to secure in the finished tool the roughened or slip-resisting surface at the exterior of the ferrule for the purposes above described.

In Fig. 14 is shown another modification of the invention in which the ferrule 4 is provided with a long extension 45, the outer end 5 of which is formed as an open-end S wrench. Fig. 15 shows an elevation of the wrench of Fig. 14, the dotted and dot and dash lines representing different positions to which the extension 45 may be bent when, for example, the tool is made of metal, in order to accommodate the tool to a particular condition when operated by the finger inserted in the ferrule 4.

In Fig. 16 is shown a tool embodying the above described features of the invention as well as certain additional features above referred to in connection with Fig. 7 which make the tool more convenient to use in situations where the finger must be bent, for example, around an obstruction to reach the fastener. In this embodiment the ferrule 4 has the general form of the ferrule of Figs. 1 to 3 but has the end edge 50 thereof shaped with a cut away portion 52 which may be positioned approximately at the crease at the inside of the first joint of the finger, thus to enable the finger to be bent easily. The wings 54, however, of the ferrule project backwardly sufficiently to provide embrace of the adjacent portion of the finger between the first and second joints thereof. The portion 56 of the ferrule which carries the fastener engaging part extends outwardly in the direction from the finger joint toward the finger end so that this fastener engaging part may reach the fastener for engagement therewith. The opposite end edge 58 of the ferrule which is adjacent the finger end is cut back to merge into the edges 8 of the ferrule slot, for example, generally parallel to the edge 50, for the purpose of avoiding at the outer surface of the bent finger catching in or contact with the adjacent parts of the structure or with the walls of the cavity or passage when the finger is inserted and bent as above mentioned to reach the fastener.

In the tool of Fig. 16 the ferrule is provided with straps 59 which may be formed in the die stamping operation or by other convenient method. The straps are raised above the exterior surface of the ferrule 4 so as to provide space for the shank 61 of the open-end wrench 62 to be inserted therebeneath so as to be held tight against the exterior surface of the ferrule. Different forms of wrenches and other tools of conventional or special design and of a size suited to the tool of the invention may be substituted for the wrench 62. Other means may be substituted for the straps 59 which will provide for insertion and removal of fastener engaging tools while holding such tool firmly for operation with the tool of the invention when the ferrule thereof is placed upon the finger.

In Fig. 17 is shown a tool having the features of the tool of Fig. 16 and provided with an extension ferrule hinged to the main ferrule and affording a greater length of embrace of the finger so as to make it possible to apply more force to the fastener. The main ferrule 4 in this embodiment is formed substantially the same as the ferrule 4 of the tool of Fig. 16 and carries the part 5 extending therefrom for engagement with the fastener, the opening 71 of said part 5 in this embodiment having a serrated or notched interior surface for this purpose. By means of pins 70 the main ferrule 4 is pivotally connected to the extension ferrule 72. The ferrule 72 is formed at each end with wings 74 similar to wings 54 of the ferrule 4, the pin 70 being positioned to connect the ferrules at these wings, the wings 54 and 74 of the ferrules being in overlapping relation. The form of the edges 75 and 76 of the two ferrules is such, as will be apparent from Fig. 17, that upon hinging movement of the ferrules one upon the other the edges 75 and 76 may be brought together and the tool attains a bent form as shown. The proportions of the ferrules may be such, as described in connection with Fig. 16, that the edges 75, 76 may be positioned at the crease of the finger joint. It will be apparent that the finger may be bent to various positions for reaching around obstructions to reach fasteners in different locations. The edge 78 of the extension ferrule, moreover, may be curved in the same manner as edge 75 or edge 50 of Fig. 16 so as to accommodate the bending of the finger at the second joint thereof.

Other modifications of the form of the tool may be made by those skilled in the art within the scope of the invention to provide the member which is supported upon one or more fingers of the hand and operable thereby and which carries the fastener engaging part in such position relative to the member that movement of the finger will be effective on the one hand to turn the fastener, such as the head of the bolt or the nut threaded thereon, or on the other hand to hold such a head or nut against turning, while also making it possible for the finger to feel the location of the fastener and its action under the turning movement of the tools being used thereon. As the tool of the invention by virtue of the embracing ferrule may be held by the embraced finger or fingers alone, the remaining fingers and the hand may be used for holding the work in place or for bracing or supporting the workman when the operation must be performed in an awkward position, for example, reaching upward above the head or outwardly beyond the support upon which the workman stands.

While the tool of the invention has been described above as made of metal which may be bent from the blank form into the form of a ferrule for embracing the finger and which may be formed in a die or otherwise to provide the fastener engaging part, within the scope of the invention other materials may be used in producing tools which have the characteristics and are capable of performing the functions above described. For example, for some purposes the tool such as that illustrated in Figs. 1, 2 and 3 may be molded of a plastic of suitable chemical and physical characteristics to provide the necessary rigidity, resistance to cutting of the walls of the recess 7 by the fastener nut or head, as well as to withstand the stress brought thereon in the tightening and loosening movement of the fastener. Other materials such as die metals may be used which may be die cast in the different shapes which are suitable for particular conditions of use and for particular types of fasteners. When the tools are made of metal, for example, of steel, stainless steel may be used to prevent corrosion and rusting. Steels which are capable of being heat treated in order to secure hardness and rigidity may be used. The tools when made of iron or steel may be magnetized in order to assist in holding the nut or the bolt in position for insertion or to prevent loss upon removal by falling into places where they cannot be readily picked up by the fingers.

Other modifications both in the forms of the fastener engaging portions of the tool and in the relation thereof to the finger embracing ferrule, as well as in the materials utilized for the tool may be made without departing from the invention as it is defined in the claims.

In the claims the word "wrench" is to be understood in its broad meaning of an instrument for producing twisting or turning movement and to include screw drivers and other tools for engaging the head of a screw or bolt or the nut associated therewith.

I claim:

1. A tool for turning or holding a nut or bolt or the like comprising a ferrule formed to embrace the end portion of a finger of the hand and open at one end for inserting the finger and open at the opposite end for the finger to protrude sufficiently to permit the finger to feel for the nut or bolt head, and a part extending from said ferrule lengthwise of the finger toward the finger tip for engaging the nut or the head of the bolt and pivotally supported on said ferrule at the end thereof from which the tactile surface of the finger protrudes so as to be felt thereby and to be movable at will to different positions with respect to the end of the finger embraced by said ferrule so as to bring said part and ferrule into convenient position for effecting turning or holding of the nut or bolt by said finger, said part being in offset relation to the exterior surface of said ferrule inwardly toward the finger to position said part in spaced relation to the solid surface of a member contacted by said exterior surface of said ferrule and with which solid surface said nut or bolt head cooperates in fastening relation.

2. A tool for turning or holding a nut or bolt or the like comprising a ferrule formed to embrace the end portion of a finger of the hand, the exterior surface of said ferrule being formed to provide substantial friction resistance to sliding movement of said ferrule over a solid surface when said ferrule is pressed by the finger with said exterior surface in contact with such solid surface, and a part extending from said ferrule at an end thereof and positioned with its face spaced from said exterior surface in a direction toward the axis of the ferrule to avoid interfering with contact of said exterior surface with said solid surface when said ferrule is moved toward said solid surface, said part being formed to engage a nut or the head of a bolt to provide a wrench operable by the finger of the hand.

3. A tool for turning or holding a nut or bolt or the like comprising a ferrule form to embrace the end portion of a finger of the hand and open at one end for inserting the finger and open at the opposite end for the finger to protrude sufficiently to permit the finger to feel for the nut or bolt head, and a part extending from said ferrule lengthwise of the finger toward the finger tip at that side of the ferrule adjacent the tactile surface of the finger and formed to engage the nut or bolt head to provide a wrench operable by the finger of the hand, said part being in offset relation to the exterior surface of the ferrule inwardly toward the finger to position said part in spaced relation to the solid surface of a member contacted by said exterior surface of said ferrule and which solid surface the nut or bolt head cooperates in fastening relation.

4. A tool for turning or holding a nut or bolt or the like as defined in claim 3, said part being formed with a recess to receive the nut or bolt head.

5. A tool for turning or holding a nut or bolt or the like as defined in claim 4, said part having an opening therein communicating with said recess through which the finger tip may feel the nut or bolt head received into said recess.

6. A tool for turning or holding a nut or bolt or the like as defined in claim 3 in which the exterior surface of the ferrule carries a coating providing a slip resisting surface at the exterior of the ferrule for contact with a solid surface of a member with which the nut or bolt head cooperates in fastening relation.

7. A tool for turning or holding a nut or bolt or the like as defined in claim 6 in which said part is pivotally supported by projecting hubs at the end of the ferrule toward the finger tip, the surface of said coating being disposed at a height above said hubs to prevent engagement of said hubs with said solid surface of said member.

8. A tool for turning or holding a nut or bolt or the like as defined in claim 3 in which said ferrule is split lengthwise of the finger to provide for adjustment thereof to fit the finger.

9. A tool for turning or holding a nut or bolt or the like as defined in claim 3 in which said ferrule is formed to embrace a plurality of fingers at the end portions thereof.

10. A tool as defined in claim 3 in which the length of said ferrule is not substantially greater than the length of the end of the finger outwardly from the first joint thereof.

11. A tool for turning or holding a nut or bolt or the like, as defined in claim 3 in which the exterior surface of the ferrule is formed to provide substantial frictional resistance to sliding movement of the ferrule when said ferrule is pressed by the finger with said exterior surface in contact with a solid surface of a member with which the nut or bolt head cooperates in fastening relation.

WILLIAM J. FASO.

REFERENCES CITED

The following references are of record in the file of this patent:

UNITED STATES PATENTS

| Number | Name | Date |
|---|---|---|
| 211,918 | Lombard | Feb. 4, 1879 |
| 312,221 | Pruim | Feb. 10, 1885 |
| 334,486 | Strong et al. | Jan. 19, 1886 |
| 413,579 | Stewart | Oct. 22, 1889 |
| 421,665 | Buchman | Feb. 18, 1890 |
| 471,221 | Moores | Mar. 22, 1892 |
| 805,664 | Ramage | Nov. 28, 1905 |
| 888,580 | Brinn | May 26, 1908 |
| 1,174,887 | Meriwether | Mar. 7, 1916 |
| 1,444,982 | Orth | Feb. 13, 1923 |
| 1,547,863 | Dulin | July 28, 1925 |
| 1,640,490 | Dovidaitis | Aug. 30, 1927 |
| 1,721,788 | Phelps | July 23, 1929 |
| 1,902,453 | Kaiser | Mar. 21, 1933 |
| 2,182,673 | Magnano | Dec. 5, 1939 |
| 2,440,854 | Frank | May 4, 1948 |

FOREIGN PATENTS

| Number | Country | Date |
|---|---|---|
| 11,057 | Great Britain | May 14, 1902 |
| 150,599 | Austria | Sept. 10, 1937 |
| 564,439 | Great Britain | Sept. 27, 1944 |